US 12,155,965 B2

(12) United States Patent
Yoo (10) Patent No.: US 12,155,965 B2
(45) Date of Patent: Nov. 26, 2024

(54) DEVICE AND METHOD FOR TRANSMITTING VIDEO (71) Applicant: SAMSUNG ELECTRONICS CO., LTD., Suwon-si (KR)

(72) Inventor: Kiwon Yoo, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 9 days.

(21) Appl. No.: 17/900,243

(22) Filed: Aug. 31, 2022

(65) Prior Publication Data
US 2023/0156150 A1 May 18, 2023

Related U.S. Application Data (63) Continuation of application No. PCT/KR2022/012095, filed on Aug. 12, 2022.

(30) Foreign Application Priority Data

Nov. 12, 2021 (KR) .................. 10-2021-0155700

(51) Int. Cl.
H04N 7/12 (2006.01)
H04N 19/102 (2014.01)
(52) U.S. Cl.
CPC ........... *H04N 7/127* (2013.01); *H04N 19/102* (2014.11)
(58) Field of Classification Search
CPC .... H04N 7/127; H04N 19/102; H04N 19/132; H04N 19/177; H04N 19/164
(Continued)

(56) References Cited

U.S. PATENT DOCUMENTS 5,101,272 A * 3/1992 Plut .................. H05G 1/60 378/98.2
8,396,983 B1 3/2013 Inskip et al.
(Continued)

FOREIGN PATENT DOCUMENTS

KR 10-1070231 10/2011
KR 10-2014-0140364 12/2014
(Continued)

OTHER PUBLICATIONS

Search Report and Written Opinion dated Nov. 22, 2022 issued in International Patent Application No. PCT/KR2022/012095.
(Continued)

*Primary Examiner* — Gims S Philippe
(74) *Attorney, Agent, or Firm* — NIXON & VANDERHYE P.C.

(57) ABSTRACT

Various embodiments of the disclosure relate to a video transmittance device and method capable of robust response to network bandwidth changes by changing the resolution or frame rate of a video based on a dual-bandwidth threshold which is a reference value for determining whether to change the resolution or frame rate of a video signal and a network bandwidth prediction value determined based on predetermined control information received from a video reception device. The video transmission device may include: receiving a video signal, setting a dual-bandwidth threshold which is a reference value for determining whether to change a resolution or a frame rate of the video signal, determining a network bandwidth prediction value based on specified control information received from a video reception device, determining whether to change the resolution or frame rate of the video based on the network bandwidth prediction value and the dual-bandwidth threshold, updating frame sequence information based on the resolution or frame rate being changed, setting an encoding parameter based on (Continued)

the changed resolution or frame rate, encoding the video signal based on the set encoding parameter, and transmitting the encoded video signal to the video reception device.

14 Claims, 7 Drawing Sheets

(58) Field of Classification Search
USPC ...................................... 375/240.02; 348/437
See application file for complete search history.

(56) References Cited

U.S. PATENT DOCUMENTS

| | | | |
|---|---|---|---|
| 9,699,518 B2* | 7/2017 | Ohbitsu | H04N 21/2402 |
| 10,419,815 B2* | 9/2019 | Pruden | H04N 21/440281 |
| 10,735,485 B2 | 8/2020 | Mihály et al. | |
| 2015/0281303 A1 | 10/2015 | Yousef et al. | |
| 2015/0381690 A1 | 12/2015 | Schmidt et al. | |
| 2016/0080449 A1* | 3/2016 | Nagamine | H04L 65/60 |
| | | | 709/219 |
| 2017/0085872 A1 | 3/2017 | Perron et al. | |
| 2017/0346874 A1 | 11/2017 | Schmidt et al. | |
| 2018/0359297 A1 | 12/2018 | Mihály et al. | |
| 2019/0320185 A1* | 10/2019 | Tanner | H04N 19/182 |
| 2020/0195994 A1* | 6/2020 | Eluvan | H04N 21/23439 |
| 2020/0228846 A1 | 7/2020 | Zhu | |
| 2022/0408123 A1* | 12/2022 | Henry | H04N 21/2407 |
| 2023/0232050 A1* | 7/2023 | Anderson | H04N 19/172 |
| | | | 375/240.02 |

FOREIGN PATENT DOCUMENTS

| | | |
|---|---|---|
| KR | 10-2015-0070568 | 6/2015 |
| KR | 10-1653898 | 8/2016 |
| KR | 10-2017-0098632 | 8/2017 |
| KR | 10-2017-0130253 | 11/2017 |
| KR | 10-2019-0054288 | 5/2019 |
| KR | 10-2021-0064116 | 6/2021 |
| KR | 10-2021-0113879 | 9/2021 |

OTHER PUBLICATIONS

Supplementary European Search Report issued on May 8, 2024 in this counterpart EP Patent Application No. 22892982.4.

* cited by examiner

FIG. 1

(RELATED ART)

DEVICE AND METHOD FOR TRANSMITTING VIDEO

CROSS-REFERENCE TO RELATED APPLICATIONS

This application is a continuation of International Application No. PCT/KR2022/012095 designating the United States, filed on Aug. 12, 2022, in the Korean Intellectual Property Receiving Office and claiming priority to Korean Patent Application No. 10-2021-0155700, filed on Nov. 12, 2021, in the Korean Intellectual Property Office, the disclosures of which are incorporated by reference herein in their entireties.

BACKGROUND

Field

The disclosure relates to a video transmission device and method capable of robust response to network bandwidth changes by changing the resolution or frame rate of a video based on a dual-bandwidth threshold which is a reference value for determining whether to change the resolution or frame rate of the video signal and a network bandwidth prediction value determined based on predetermined control information received from a video reception device.

Description of Related Art

A video transmission device may share a video by streaming the video to a video reception device through an IP-based network. The video transmission device may encode a video and generate a streaming data packet and transmit it to the video reception device. The video reception device may receive the streaming data packet, decode the video, and then play the video. A series of streaming data packets transmitted by the video transmission device is called a stream.

The adaptive streaming service refers to a scheme for adaptively changing the quality of the streaming service, such as the resolution and frame rate of the video depending on changes in network environment, such as transmission bandwidth, and transmitting it.

In a chunk-based adaptive streaming service, as an example of an adaptive streaming service, the video transmission device switches streams in chunk units depending on a change in network environment in a state of storing the video encoded with their respective resolutions and frame rates in the form of chunks having a predetermined length. Thus, it may not immediately respond to network variability and thus cause a delay.

To address such issues, in an adaptive streaming service which may provide streaming service in units of frames made up of chunks, each resolution or frame rate period is divided by its corresponding threshold, and the video transmission device changes the resolution or frame rate depending on a change in network environment based on the threshold and streams it. Thus, the frame-based adaptive streaming service allows for low-latency streaming as compared with the chunk-based adaptive streaming service. However, in the frame-based adaptive streaming service, the sensitivity to network bandwidth variability is increased, so that the resolution or frame rate may be frequently changed in frame units and, as the resolution or frame rate is changed, the infra frames (I frames) which are non-compressed/reference frames which require independent encoding according to a change in resolution or frame rate are overly used, causing degradation of compression performance and resultant video quality degradation.

Figure 1:
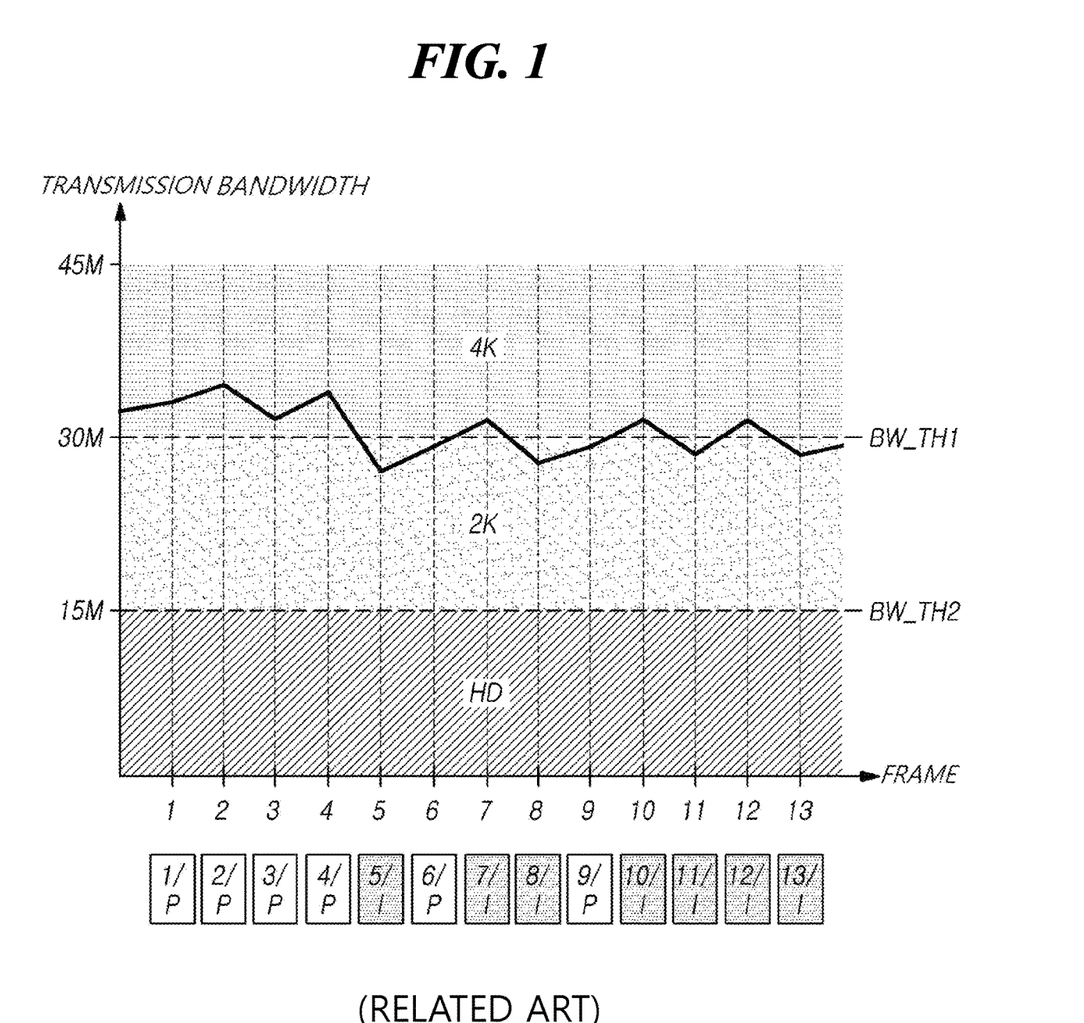
FIG. 1 is a diagram illustrating a scenario in which a video transmission device changes the resolution of a video in response to network bandwidth variability in a conventional frame-based adaptive streaming service.

FIG. 1 conceptually illustrates a scenario in which a video transmission device changes the resolution of a video in response to network bandwidth variability in a conventional frame-based adaptive streaming service. Referring to FIG. 1, the video transmission device divides the video into three resolution sections of 4K, 2K, and HD based on two thresholds of BW_TH1 and BW_TH2 and provides the video streaming service. If the network bandwidth is sequentially varied as denoted by the solid line, the video transmission device may change the resolution around the BW_TH1 resolution seven times and use the I frame seven times according to the changes in resolution to perform encoding. Since the I frame does not use inter-frame compression, its compression efficiency is several tens or several hundreds of times lower than the predicted frame (P frame) or bidirectional frame (B frame). Accordingly, the conventional frame-based adaptive streaming service may encounter drastic degradation of compression performance and video quality due to use of many I frames within a short time.

In providing an adaptive streaming service, when network bandwidth variability is sensitive due to frequent variations in network bandwidth around the threshold corresponding to each resolution or frame rate section, the video transmission device needs a robust response to the network bandwidth variability by suppressing frequent variations in resolution or frame rate while adaptively streaming in real-time.

SUMMARY

Embodiments of the disclosure provide a video transmission device and method that changes the resolution or frame rate of a video based on a dual-bandwidth threshold which is a reference value for determining whether to change the resolution or frame rate of the video signal, and a network bandwidth prediction value determined based on predetermined control information received from the video reception device.

According to an example embodiment of the disclosure, a video transmission device may comprise: a communication unit comprising communication circuitry configured to transmit and/or receive data through a network, a video input unit comprising circuitry configured to receive a video signal, a memory storing a dual-bandwidth threshold comprising a reference value for determining whether to change a resolution or a frame rate of the video signal, a video pre-processing unit comprising circuitry configured to: set the dual-bandwidth threshold, store the dual-bandwidth threshold in the memory, determine a network bandwidth prediction value based on specified control information received from a video reception device by controlling the communication unit, and determine whether to change the resolution or frame rate of the video signal based on the network bandwidth prediction value and the dual-bandwidth threshold, a video encoding unit comprising circuitry configured to: upload frame sequence information based on the resolution or frame rate being changed, set an encoding parameter based on the changed resolution or frame rate, and encode the video signal based on the set encoding parameter, and a video output unit comprising circuitry configured to control the communication unit to transmit the encoded video signal to the video reception device.

According to an example embodiment of the disclosure, a video transmission method may comprise: receiving a video signal, setting a dual-bandwidth threshold including a reference value for determining whether to change a resolution or a frame rate of the video signal, determining a network bandwidth prediction value based on specified control information received from a video reception device, determining whether to change the resolution or frame rate of the video based on the network bandwidth prediction value and the dual-bandwidth threshold, updating frame sequence information based on the resolution or frame rate being changed, setting an encoding parameter based on the changed resolution or frame rate, encoding the video signal based on the set encoding parameter, and transmitting the encoded video signal to the video reception device.

According to various example embodiments of the disclosure, the video transmission device may adaptively encode video considering the network bandwidth variability and may thus transmit high-quality video at a low-latency.

When the network bandwidth is frequently varied around the threshold corresponding to each resolution or frame rate so that the network bandwidth variability is sensitive, the video transmission device may determine whether to change the resolution or frame rate of the video based on the dual-bandwidth threshold or multi-bandwidth threshold, thus reducing the frequency of changing the resolution or frame rate, preventing and/or reducing overuse of the non-compressed I frame, and hence preventing and/or reducing degradation of compression performance and video quality, and allowing for robust response to network bandwidth variability.

It is possible to provide an integrated viewing experience capable of freely viewing or sharing video seamlessly, anywhere in the house, through low-latency, high-quality video streaming.

Effects of the disclosure are not limited to the foregoing, and other unmentioned effects would be apparent from the following description.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

For use in describing the various example embodiments of the disclosure, common terms widely used as possible have been chosen considering functions in the disclosure, but the terms may be varied depending on the intent of one of ordinary skill in the art or case laws or the advent of new technologies. In certain cases, some terms may be arbitrarily selected, and in such case, their detailed definitions may be given in the relevant parts thereof. Accordingly, the terms used herein should be determined based on their meanings and the overall disclosure, rather than by the terms themselves.

When an element "includes" another element, the element may further include the other element, rather excluding the other element, unless particularly stated otherwise. Further, the terms "unit," "module," or "part" as used herein denote a unit processing at least one function or operation, and a unit, module, or part may be implemented in hardware, software, or a combination thereof.

Embodiments of the disclosure are now described with reference to the accompanying drawings. However, the disclosure may be implemented in other various forms and is not limited to the embodiments set forth herein. In the drawings, the same reference numerals refer to the same elements, and the size of each component in the drawings may be exaggerated for clarity of description.

Figure 2:
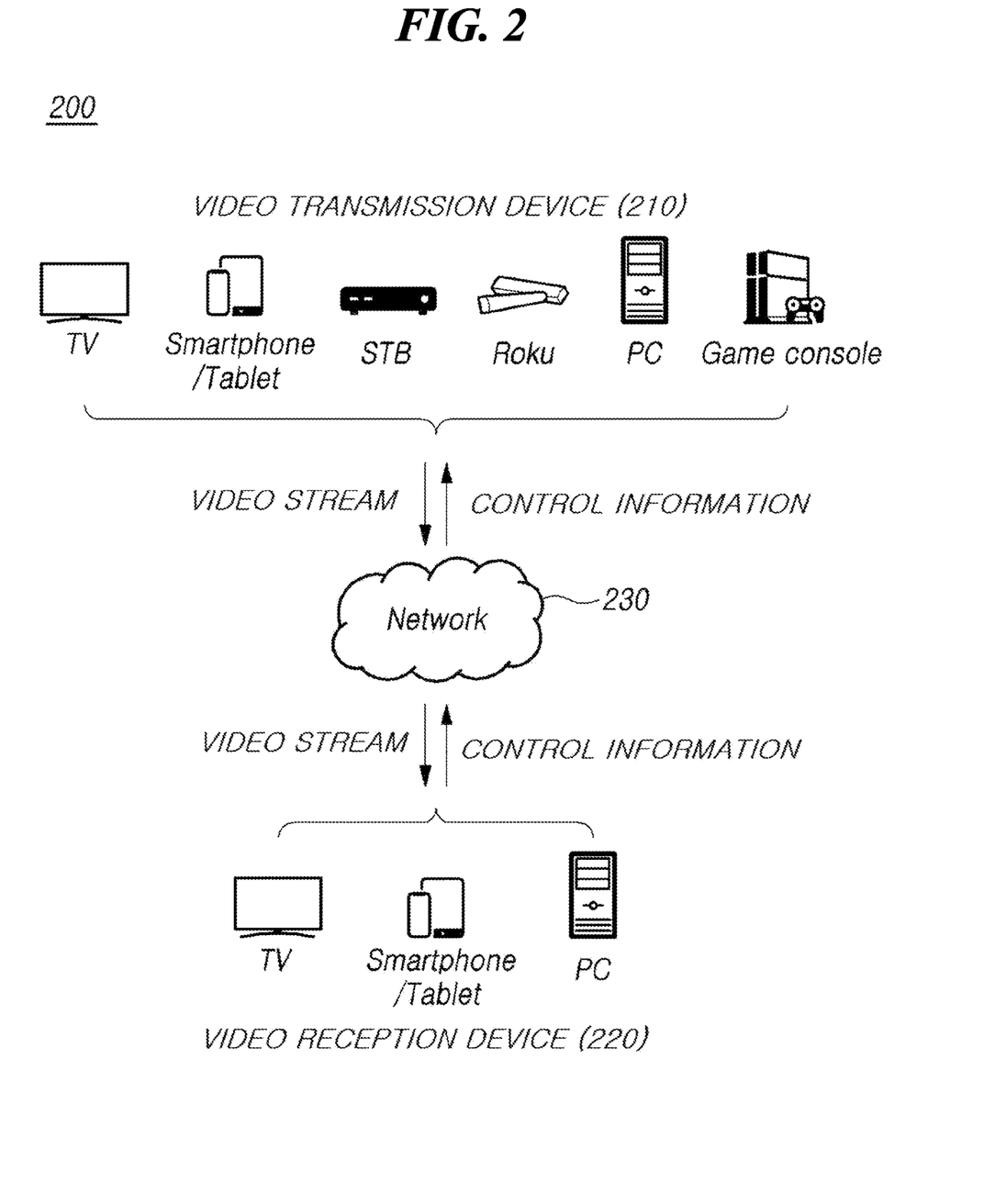
FIG. 2 is a diagram illustrating an example system of providing an adaptive streaming service according to various embodiments.

FIG. 2 is a diagram illustrating an example system of providing an adaptive streaming service according to various embodiments.

Referring to FIG. 2, an adaptive streaming service providing system 200 according to an embodiment may include a video transmission device 210 and a video reception device 220. The video transmission device 210 may change the resolution or frame rate depending on a variation in network environment, encode the video frame, and provide the video stream (or video signal) to the video reception device 220, and the video reception device 220 may receive and play the video stream from the video transmission device 210. The video transmission device 210 may determine a network bandwidth prediction value according to the variation in network environment based on predetermined control information received from the video reception device 220 or may receive the network bandwidth prediction value determined by the video reception device 220 from the video reception device 220. For example, the video transmission device 210 may determine the network bandwidth prediction value according to the variation in network environment considering the network transmission time of the acknowledgment (ACK) received from the video reception device 220, but it will be appreciated that other various types or pieces of control information may be used. When the video reception device 220 determines the network bandwidth prediction value and transmits the network bandwidth prediction value to the video transmission device 210, the video reception device 220 may determine the network bandwidth prediction value based on previously transmitted video stream transmission information, but it will be appreciated that the network bandwidth prediction value may be determined by other various methods. The video transmission device 210 may determine the resolution or frame rate on a per-frame basis based on the network bandwidth prediction value, thereby providing a low-latency video streaming service adaptively considering the variation in network environment. The video transmission device 210 may include various video source devices, such as a TV, a PC, a smartphone, a tablet, a set-top box, and a game console, and the video reception device 220 may include various video playback devices, such as a TV, a smartphone, a tablet, and a PC. It is apparent that the video transmission device 210 and the video reception device 220 are not limited to a specific type of devices.

The video transmission device 210 and the video reception device 220 may transmit/receive a video stream and control information through the network 230. According to various embodiments, the network 230 connecting the video transmission device 210 and the video reception device 220 may include a short-range communication network, such as wireless fidelity (Wi-Fi), or a remote communication network, such as a cellular network, a next-generation communication network, the Internet, or a computer network (e.g., LAN or WAN), and may communicate based on an IP communication protocol. The cellular network may include global system for mobile communications (GSM), enhanced data GSM environment (EDGE), code division multiple access (CDMA), time division multiplexing access (TDMA), 5G, long-term evolution (LTE), and LTE-advanced (LTE-A). The network 230 may include connections of network components, such as hubs, bridges, routers, switches, and gateways. The network 230 may include one or more connected networks, e.g., a multi-network environment, including public networks such as the Internet and private networks such as safe business private networks. Access to the network 230 may be provided via one or more wired or wireless access networks. Further, the network 230 may support Internet-of-things (IoT) networks, which exchange information between distributed components, e.g., things, and process the information.

Figure 3:
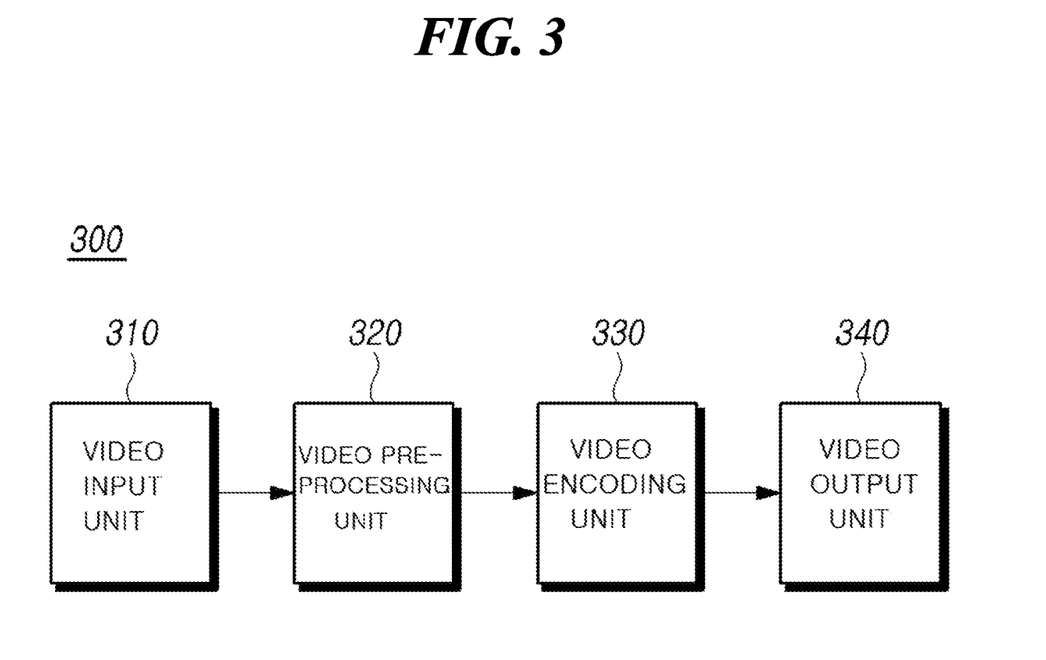
FIG. 3 is a block diagram illustrating an example configuration of a video transmission device providing an adaptive streaming service according to various embodiments.

FIG. 3 is a block diagram illustrating an example configuration of a video transmission device providing an adaptive streaming service according to various embodiments.

Referring to FIG. 3, the video transmission device 300 may include a video input unit (e.g., including video input circuitry) 310, a video pre-processing unit (e.g., including processing circuitry) 320, a video encoding unit (e.g., including video encoding circuitry) 330, and a video output unit (e.g., including video output circuitry) 340. The video transmission device 300 may further include a memory (not shown), a processor (not shown), and a communication unit (not shown). The video transmission device 300 may include additional components in addition to the illustrated components, or may omit at least one of the illustrated components.

According to an embodiment, the memory may store a program including one or more instructions or data such as configuration information. The memory may be configured as a volatile memory, a non-volatile memory, or a combination of a volatile memory and a non-volatile memory. The memory may provide stored data according to a request of the processor.

According to an embodiment, the communication unit may include various communication circuitry and provide an interface for communication with other systems or devices. The communication unit may include a network interface card or a wireless transmission/reception unit that enables communication through an external network (e.g., a network). The communication unit may perform signal processing for accessing a wireless network. The wireless network may include, e.g., at least one of a wireless LAN or a cellular network (e.g., long-term evolution (LTE)).

According to an embodiment, the processor may include various processing circuitry, may be electrically connected to the communication unit and the memory and may execute computation or data processing regarding communication and/or control of at least one other component of the video transmission device 300, using the program stored in the memory. The processor may execute at least one instruction corresponding to the video input unit 310, the video pre-processing unit 320, the video encoding unit 330, and the video output unit 340. The processor may include at least one of a central processing unit (CPU), a graphic processing unit (GPU), a micro controller unit (MCU), a sensor hub, a supplementary processor, a communication processor, an application processor, an application specific integrated circuit (ASIC), or field programmable gate arrays (FPGA) and may have multiple cores.

According to an embodiment, the video input unit 310 may include various video input circuitry and receive a video frame. The video frame may be received from the outside of the video transmission device 300 or may be embedded in the video transmission device 300. The video input unit 310 may control the communication unit to receive the video frame from the outside in a wired or wireless scheme.

According to an embodiment, the video pre-processing unit 320 may include various video processing circuitry and determine the network bandwidth prediction value based on predetermined control information received from the video reception device 220 or may obtain the network bandwidth prediction value received from the video reception device 220. For example, the video pre-processing device 320 may determine the network bandwidth prediction value according to the variation in network environment considering the network transmission time of the acknowledgment (ACK) received from the video reception device 220, but it will be appreciated that other various types or pieces of control information may be used. When the video reception device 220 determines the network bandwidth prediction value and transmits the network bandwidth prediction value to the video transmission device 300, the video reception device 220 may determine the network bandwidth prediction value based on previously transmitted video stream transmission information, but it will be appreciated that the network bandwidth prediction value may be determined by other various methods.

The video pre-processing unit 320 may set a dual-bandwidth threshold and store it in the memory, and may determine whether the resolution or frame rate of the video is changed based on the network bandwidth prediction value and the set dual-bandwidth threshold. The dual-bandwidth threshold may include an upper bandwidth threshold, which is a reference value for determining whether to increase the resolution or frame rate from a first resolution or first frame rate to a second resolution or second frame rate, or a lower bandwidth threshold, which is a reference value for determining whether to decrease the resolution or frame rate from the second resolution or second frame rate to the first resolution or first frame rate. The video pre-processing unit 320 may set the dual-bandwidth threshold based on an external input.

If the network bandwidth prediction value exceeds the upper bandwidth threshold, the video pre-processing unit 320 may change the resolution or frame rate from the first resolution or first frame rate to the second resolution or second frame rate. If the network bandwidth prediction value is less than the lower bandwidth threshold, the video pre-processing unit 320 may change the resolution or frame rate from the second resolution or second frame rate to the first resolution or first frame rate.

According to an embodiment, the video encoding unit 330 may include various video encoding circuitry and update frame sequence information when the resolution or frame rate is changed. The frame sequence information may refer, for example, to header information containing information related to encoding or decoding of the frame sequence, such as profile, level, resolution, or frame rate. For example, the frame sequence information may include H.264 codec sequence parameter set (SPS), but it is apparent that it is not limited thereto. The profile may refer, for example, to a collection of the minimum necessary technical elements and functions for a representative application system among the technical elements of the encoding/decoding operation of the video.

The video encoding unit 330 may set encoding parameters based on the resolution or frame rate determined by the video pre-processing unit 320. The encoding parameter may include at least one piece of encoding information, such as frame rate, intra/inter mode prediction, in-loop filter, or slice type, but it is apparent that it is not limited thereto. Inter-mode prediction may refer, for example, to an encoding scheme for generating a prediction block from the picture coded at a previous time. Intra-mode prediction may refer, for example, to an encoding scheme for generating a prediction value for the block to be coded from coded adjacent pixels in the current picture. The in-loop filter may refer to a technique for enhancing the quality of the reconstructed video, and may include a deblocking filter, a sample adaptive offset (SAO), and an adaptive loop filter (ALF). The deblocking filter may remove block distortion occurring at the boundary between blocks in the reconstructed picture. The SAO may add an appropriate offset value to the pixel value to compensate for a coding error. The ALF may perform filtering based on a value obtained by comparing the reconstructed video with the original video after the block is filtered through the deblocking filter. Slice type indicates the type of slice, which is the basic unit for encoding, and may include P, B, I, SP, SI slices, and the like. The P slice may refer, for example, to the slice where intra-picture encoding or inter-picture prediction coding using one reference picture is performed. The B slice may refer, for example, to the slice where intra-picture encoding or inter-picture prediction coding using two reference pictures is performed. The I slice may refer, for example, to the slice where only intra-picture encoding is performed. The SP slice may refer, for example, to a special P slice for performing bit string conversion. The SI slice may refer, for example, to a special I slice for performing bit string conversion. The video encoding unit 330 may encode the first frame after the resolution or frame rate is changed, with the I slice independently from the previous frames. The video transmission device 300 may encode the frame based on the set encoding parameter.

According to an embodiment, the video output unit 340 may include various video output circuitry and control the communication unit to transmit a video signal including the encoded frame through the network 230 to the video reception device 220.

Figure 4:
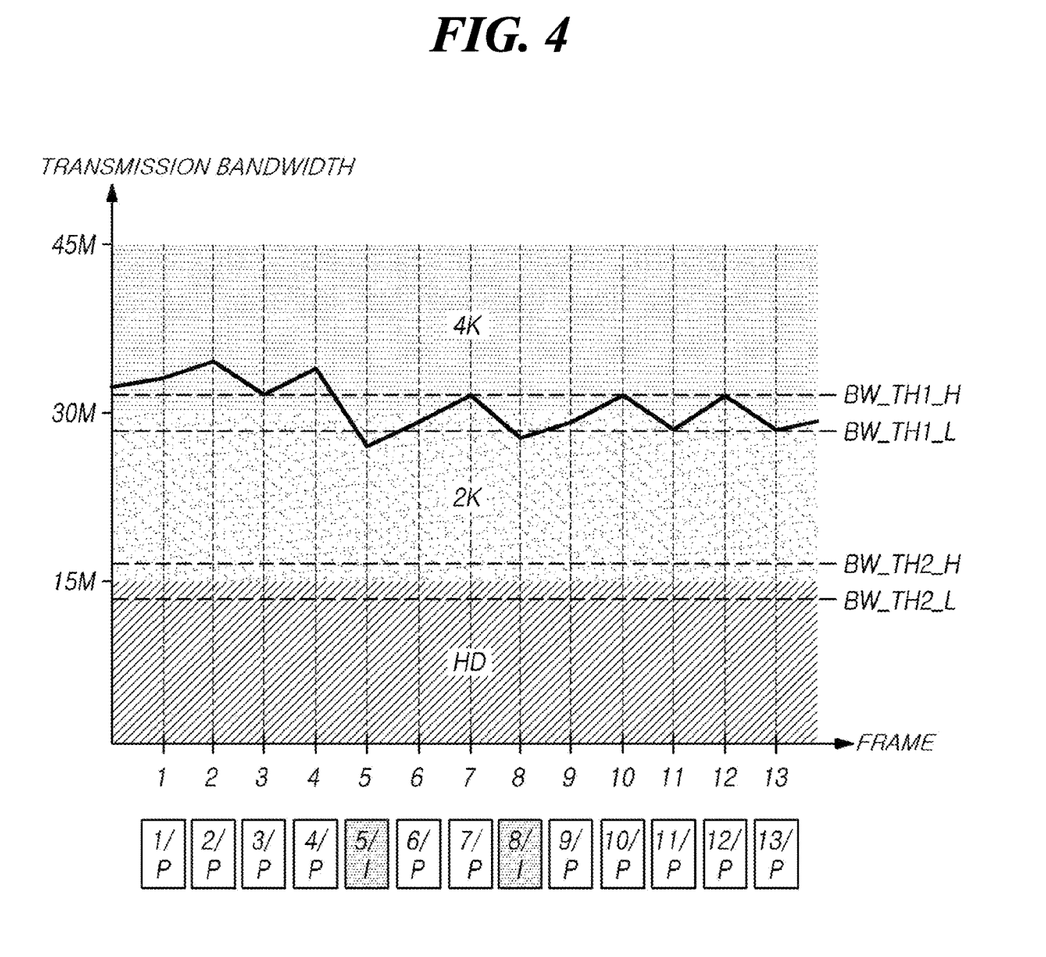
FIGS. 4 and 5 are diagrams illustrating example scenarios in which a video transmission device changes the resolution of a video in response to network bandwidth variability according to various embodiments.
Figure 5:
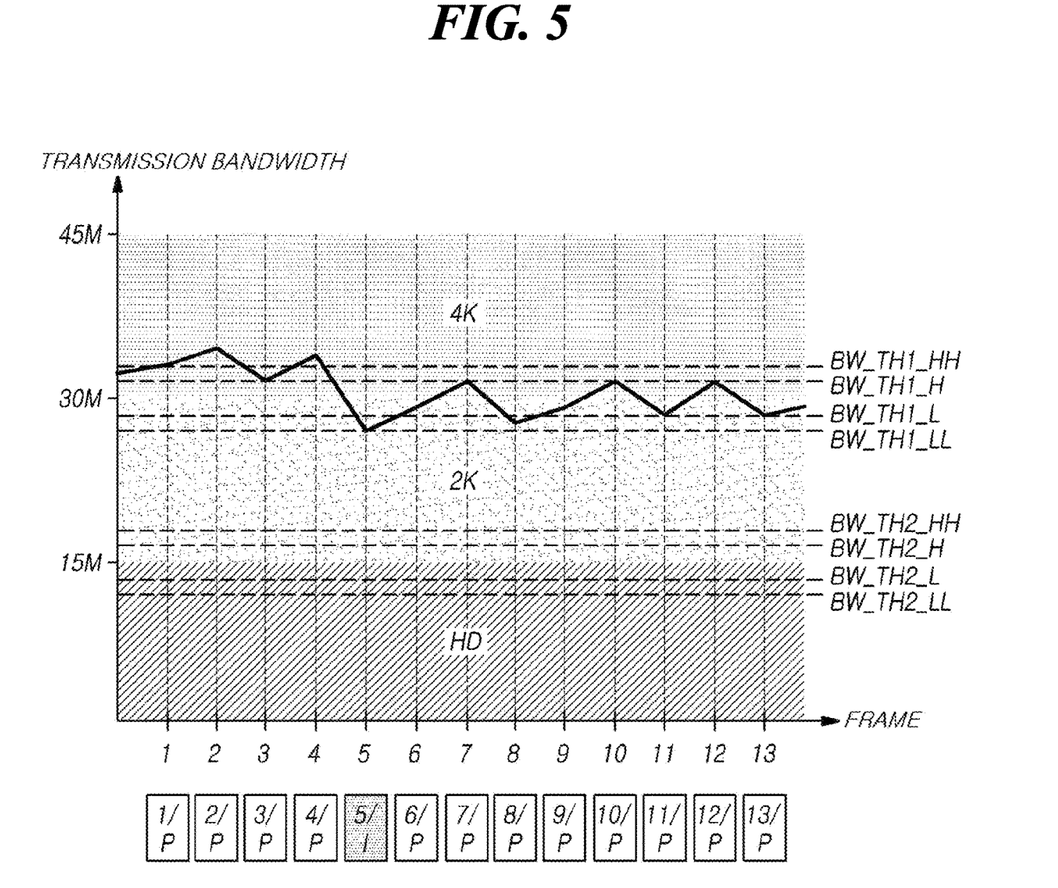

FIGS. 4 and 5 are diagrams illustrating an example scenario in which a video transmission device changes the resolution of a video in response to network bandwidth variability according to various embodiments.

Referring to FIG. 4, the video pre-processing unit 320 may set a first dual-bandwidth threshold including a lower bandwidth threshold BW_TH1_L, which is the reference value for determining whether to decrease the resolution of the video from 4K to 2K, and an upper bandwidth threshold BW_TH1_H, which is the reference value for determining whether to increase the resolution of the video from 2K to 4K, based on an external input. Further, the video pre-processing unit 320 may set another first dual-bandwidth threshold including a lower bandwidth threshold BW_TH2_L, which is the reference value for determining whether to decrease the resolution of the video from 2K to HD, and an upper bandwidth threshold BW_TH2_H, which is the reference value for determining whether to increase the resolution of the video from HD to 2K, based on an external input.

Referring to the illustrated example, the video pre-processing unit 320 may change the resolution of the video from the 2K resolution to the 4K resolution when the network bandwidth prediction value exceeds the upper bandwidth threshold BW_TH1_H. The video pre-processing unit 320 may change the resolution of the video from the 4K resolution to the 2K resolution when the network bandwidth prediction value is less than the lower bandwidth threshold BW_TH1_L. In the illustrated example, the video pre-processing unit 320 may perform two resolution changes based on the first dual-bandwidth threshold and the network bandwidth prediction value. Since the video encoding unit 330 encodes the first frame after the resolution is changed, with the I frame independent from the previous frames, I frame encoding may be performed two times.

According to an embodiment, when the network bandwidth is frequently varied around the threshold corresponding to each resolution or frame rate so that the network bandwidth variability is sensitive, the video pre-processing unit 320 may determine whether to change the resolution or frame rate of the video based on the first dual-bandwidth threshold, thus reducing the frequency of changing the resolution or frame rate, preventing and/or reducing overuse of the non-compressed I frame, and hence preventing and/or reducing degradation of compression performance and video quality, and allowing for robust response to network bandwidth variability.

Figure 6:
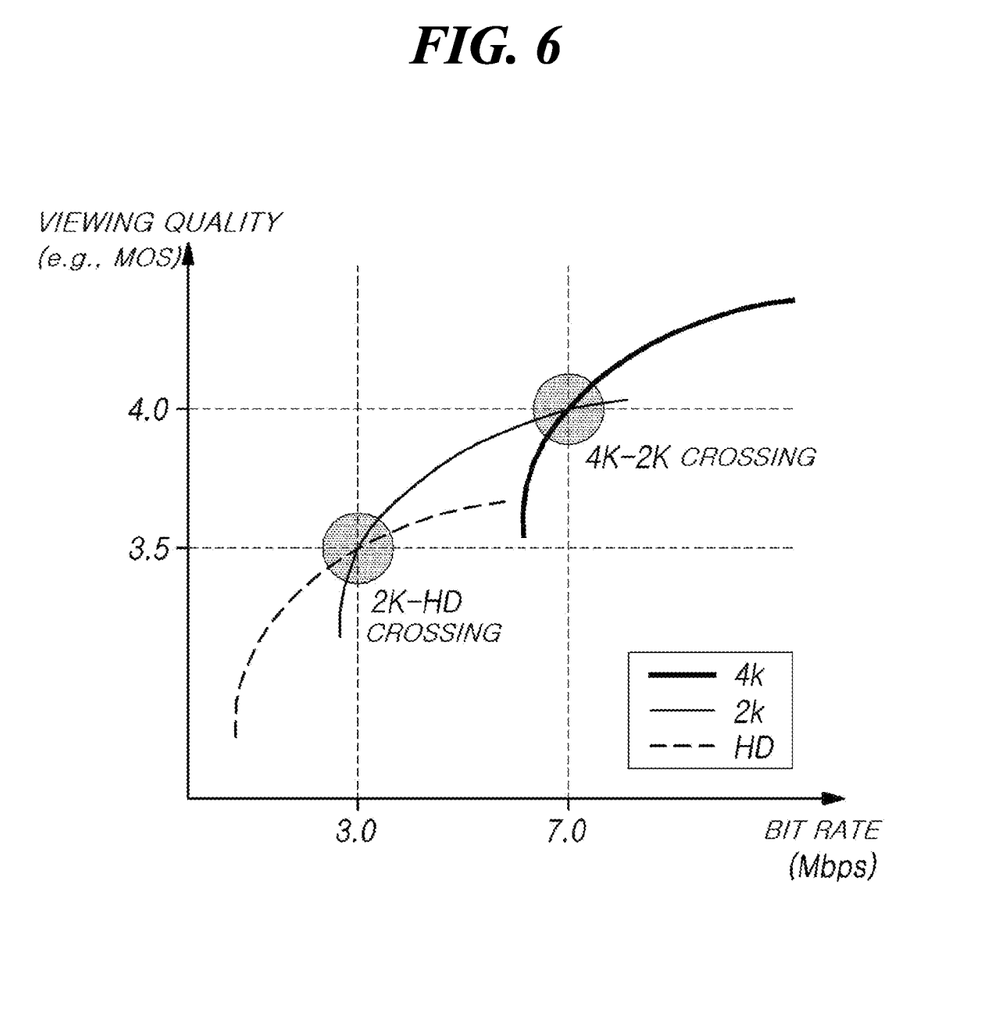
FIG. 6 is a graph illustrating a correlation between per-resolution bit rate and viewing quality according to various embodiments.

FIG. 6 is a graph a correlation between per-resolution bit rate and viewing quality according to various embodiments.

Referring to FIG. 6, a high-resolution video, such as of 4K, provides excellent quality but, due to the increase in the number of pixels, undergoes an increase in compression rate as compared with low-resolution video if the transmission bit rate of the network reduces and may thus be subject to severe quality degradation. Referring to the illustrated example, the viewing qualities of the 4K video and the 2K video may cross at a bit rate of 7 Mbps, and the 2K video and the HD video may cross at a bit rate of 3 Mbps. The viewing quality may be measured by evaluation methods, such as mean opinion score (MOS) and video multimethod assessment fusion (VMAF), but it is apparent that it may be measured using other various evaluation methods.

Accordingly, the video pre-processing unit 320 may reduce the frequency of changing the resolution without degradation of the viewing quality although setting a dual-bandwidth threshold including the lower bandwidth threshold BW_TH1_L and the upper bandwidth threshold BW_TH1_H around the bit rate where the viewing qualities cross, such as 7 Mbps and determining whether the resolution of the video is changed based on the dual-bandwidth threshold, thus allowing for a robust response to network bandwidth variability.

Referring to FIG. 5, the dual-bandwidth threshold may further include a second dual-bandwidth threshold in addition to the first dual-bandwidth threshold described above with reference to FIG. 4. The second dual-bandwidth threshold may include a second upper bandwidth threshold (BW_TH1_HH, BW_TH2_HH), which is a reference value for determining whether to increase the resolution or frame rate from a first resolution or first frame rate to a second resolution or second frame rate, and a second lower bandwidth threshold (BW_TH1_LL, BW_TH2_LL), which is a reference value for determining whether to decrease the resolution or frame rate from the second resolution or second frame rate to the first resolution or first frame rate. The second upper bandwidth threshold may be a predetermined value larger than the first upper bandwidth threshold, and the second lower bandwidth threshold may be a predetermined value smaller than the first lower bandwidth threshold.

If there is a resolution or frame rate change history within a predetermined time, the video pre-processing unit 320 may determine whether to change the resolution or frame rate based on the network bandwidth prediction value and the second dual-bandwidth threshold. In other words, if there is a history of having the resolution or frame rate within the predetermined time, the video pre-processing unit 320 may determine whether to change the resolution or frame rate based on the second dual-bandwidth threshold which has a larger interval between the second upper bandwidth threshold and the second lower bandwidth threshold and thus robustly respond to network bandwidth variability.

Referring to FIG. 5, in a case where if there is a resolution change within a time of previous five frames, if the network bandwidth prediction value exceeds the second upper bandwidth threshold BW_TH1_HH, the video pre-processing unit 320 may change the resolution of the video from the 2K resolution to the 4K resolution. Further, in a case where if there is a resolution change within a time of previous five frames, if the network bandwidth prediction value is less than the second lower bandwidth threshold BW_TH1_LL, the video pre-processing unit 320 may change the resolution of the video from the 4K resolution to the 2K resolution. In the illustrated example, since there is a resolution change from 4K to 2K in the fifth frame, in the case of the eighth frame, it is determined whether the resolution is changed based on the second dual-bandwidth threshold and the network bandwidth prediction value. Thus, the video pre-processing unit 320 may determine not to change the resolution.

According to an embodiment, the video pre-processing unit 320 may set the second dual-bandwidth threshold based on an external input. The video pre-processing unit 320 may dynamically set the second dual-bandwidth threshold so that the difference between the second upper bandwidth threshold and the second lower bandwidth threshold has a predetermined value corresponding to the time difference between the video frame, where at least one of the resolution and frame rate has been changed most recently, and the current video frame. In other words, the second dual-bandwidth threshold may be dynamically set so that as the time difference from the frame where at least one of the resolution and the frame rate has been changed most recently decreases, the interval between the second upper bandwidth threshold and the second lower bandwidth threshold is increased by a predetermined value.

According to an embodiment, if there is a change in resolution or frame rate within the predetermined time, the video pre-processing unit 320 may determine not to change the resolution or frame rate.

According to an embodiment, the video pre-processing unit 320 may set multi-bandwidth threshold including at least one dual-bandwidth threshold respectively corresponding to at least one network bandwidth variation level. The network bandwidth variation level may be determined using statistical values, such as the mean band value and variance, based on previous network bandwidth information during a predetermined time, but it is apparent that it may be determined by other various methods. The multi-bandwidth threshold may be set in such a manner as to increase the interval between the upper bandwidth threshold and lower bandwidth threshold as the network bandwidth variation level increases while decreasing the interval between the upper bandwidth threshold and lower bandwidth threshold as the network bandwidth variation level decreases. The multi-bandwidth threshold may be dynamically set using the network bandwidth variation level as a variable. The video pre-processing unit 320 may determine whether to change the resolution or frame rate of the video based on the dual-bandwidth threshold corresponding to the variation level of the network bandwidth prediction value during a predetermined time, of the multi-bandwidth threshold.

Figure 7:
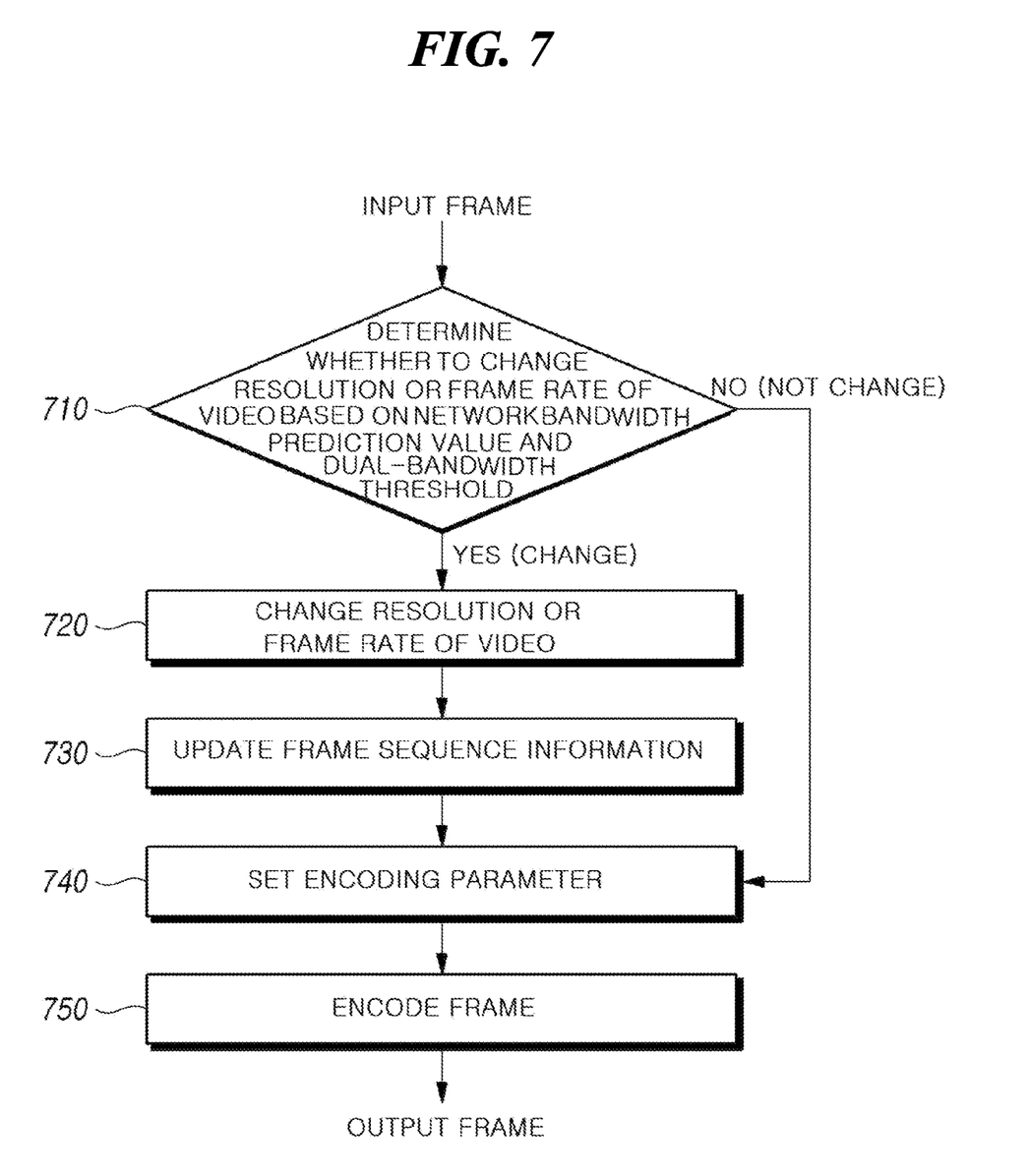
FIG. 7 is a flowchart illustrating an example video transmission method according to various embodiments.

FIG. 7 is a flowchart illustrating an example video transmission method according to various embodiments.

According to an embodiment, the video transmission device 300 may receive a video frame (or video signal). The video frame may be received from the outside of the video transmission device 300 or may be embedded in the video transmission device 300.

According to an embodiment, the video transmission device 300 may determine the network bandwidth prediction value based on predetermined control information received from the video reception device 220 or may obtain the network bandwidth prediction value received from the video reception device 220.

According to an embodiment, the video transmission device 300 may set a dual-bandwidth threshold which is a reference value for determining whether to change the resolution or frame rate of the video signal and store the dual-bandwidth threshold in the memory.

According to an embodiment, in operation 710, the video transmission device 300 may determine whether to change the resolution or frame rate of the video based on the network bandwidth prediction value and the dual-bandwidth threshold.

According to an embodiment, the dual-bandwidth threshold may include a first dual-bandwidth threshold. The first dual-bandwidth threshold may include a first upper bandwidth threshold, which is a reference value for determining whether to increase the resolution or frame rate from a first resolution or first frame rate to a second resolution or second frame rate, and a first lower bandwidth threshold, which is a reference value for determining whether to decrease the resolution or frame rate from the second resolution or second frame rate to the first resolution or first frame rate. The video transmission device 300 may previously set the first dual-bandwidth threshold based on an external input. If the network bandwidth prediction value exceeds the first upper bandwidth threshold, the video transmission device 300 may change the resolution or frame rate from the first resolution or first frame rate to the second resolution or second frame rate. If the network bandwidth prediction value is less than the first lower bandwidth threshold, the video transmission device 300 may change the resolution or frame rate from the second resolution or second frame rate to the first resolution or first frame rate.

According to an embodiment, the dual-bandwidth threshold may include a second dual-bandwidth threshold. The second dual-bandwidth threshold may include a second upper bandwidth threshold, which is a reference value for determining whether to increase the resolution or frame rate from the first resolution or first frame rate to the second resolution or second frame rate, and a second lower bandwidth threshold, which is a reference value for determining whether to decrease the resolution or frame rate from the second resolution or second frame rate to the first resolution or first frame rate. The second upper bandwidth threshold may be a predetermined value larger than the first upper bandwidth threshold, and the second lower bandwidth threshold may be a predetermined value smaller than the first lower bandwidth threshold. If there is a resolution or frame rate change history within a predetermined time, the video transmission device 300 may determine whether to change the resolution or frame rate based on the network bandwidth prediction value, the second upper bandwidth threshold, and the second lower bandwidth threshold. The video transmission device 300 may previously set the second dual-bandwidth threshold based on an external input. Alternatively, the video transmission device 300 may dynamically set the second dual-bandwidth threshold so that the difference between the second upper bandwidth threshold and the second lower bandwidth threshold has a predetermined value corresponding to the time difference between the video frame, where at least one of the resolution and frame rate has been changed most recently, and the current video frame.

According to an embodiment, if there is a change in resolution or frame rate within the predetermined time, the video transmission device 300 may determine not to change the resolution or frame rate.

According to an embodiment, the video transmission device 300 may set multi-bandwidth threshold including at least one dual-bandwidth threshold respectively corresponding to at least one network bandwidth variation level. In this case, the video transmission device 300 may determine whether to change the resolution or frame rate of the video based on the dual-bandwidth threshold corresponding to the variation level of the network bandwidth prediction value during a predetermined time, of the multi-bandwidth threshold.

The video transmission device 300 may perform operation 720 when the resolution or frame rate is changed or may perform operation 740 when the resolution or frame rate is not changed.

In operation 720, the video transmission device 300 may change the resolution or frame rate of the video based on the network bandwidth prediction value and the dual-bandwidth threshold.

In operation 730, the video transmission device 300 may update frame sequence information. The frame sequence information may refer, for example, to header information containing information related to encoding or decoding of the frame sequence, such as profile, level, resolution, or frame rate.

In operation 740, the video transmission device 300 may set an encoding parameter based on the determined resolution or frame rate.

In operation 750, the video transmission device 300 may encode a video frame (or a video signal) based on the determined resolution or frame rate. The video transmission device 300 may transmit the encoded video signal to the video reception device 220.

The method executed by the video transmission device 300 and the video reception device 220 may be implemented as a hardware component, a software component, and/or a combination thereof. The method may be executed by any system capable of executing computer readable instructions.

Software, as used herein, may include computer programs, codes, instructions, or combinations of one or more thereof and may configure the processing device as it is operated as desired or may instruct the processing device independently or collectively. The software may be implemented as a computer program including instructions stored in computer-readable storage media. The computer-readable recording media may include, e.g., magnetic storage media (e.g., read-only memory (ROM), random-access memory (RAM), floppy disk, hard disk, etc.) and an optically readable media (e.g., CD-ROM or digital versatile disc (DVD). Further, the computer-readable recording media may be distributed to computer systems connected via a network, and computer-readable codes may be stored and executed in a distributed manner. The media may be read by a computer, stored in a memory, and executed by a processor.

The computer-readable storage medium may be provided in the form of a non-transitory storage medium. Here, the "non-transitory" storage medium may not include a signal and is tangible, but this term does not differentiate between where data is semi-permanently stored in the storage medium and where data is temporarily stored in the storage medium.

According to embodiments of the disclosure, the program may be included and provided in a computer program product. The computer program products may be traded as commodities between sellers and buyers. The computer program products may include software programs or computer-readable storage media storing the software programs. For example, the computer program products may include software program-type products (e.g., downloadable applications (apps)) that are electronically distributed through manufacturers of electronic devices or electronic markets (e.g., Google Play Store or App Store). For electronic distribution, at least part of the software programs may be stored in storage media or temporarily generated. In this case, the storage media may be storage media of relay servers that temporarily store the software programs, servers of electronic markets, or servers of manufacturers.

The computer program product may include a storage medium of a server or a storage medium of a device in a system including the server and the device. Alternatively, when there is a third device (e.g., a smart phone) that is communicatively connected to the server or device, the computer program product may include a storage medium of the third device. Alternatively, the computer program product may include the software program itself transmitted from the server to the device or the third device, or transmitted from the third device to the device. In this case, one of the server, the device, and the third device may execute the computer program product to perform the method according to the disclosed embodiments. Alternatively, two or more of the server, the device, and the third device may execute the computer program product to distributively implement the method according to the disclosed embodiments. For example, the server may execute the computer program product stored in the server to control the device communicatively connected with the server to perform the method according to the disclosed embodiments. As another example, the third device may execute the computer program product to control the device communicatively connected to the third device to perform the method according to the disclosed embodiment. When the third device executes the computer program product, the third device may download the computer program product from the server and execute the downloaded computer program product. Alternatively, the third device may execute the computer program product provided in a pre-loaded state to perform the method according to the disclosed embodiments.

While the disclosure has been illustrated and described with reference to various example embodiments, it will be understood that the various example embodiments are intended to be illustrative, not limiting. It will be further understood by one of ordinary skill in the art that various changes or modifications may be made without departing from the true spirit and full scope of the disclosure including the appended claims and their equivalents. It will also be understood that any of the embodiment(s) described herein may be used in conjunction with any other embodiment(s) described herein.

What is claimed is:

1. A video transmission device, comprising:
   a communication unit comprising communication circuitry configured to transmit and/or receive data through a network;
   a video input unit comprising circuitry configured to receive a video signal;
   a memory storing a dual-bandwidth threshold comprising a reference value for determining whether to change a resolution or a frame rate of the video signal;
   a video pre-processing unit comprising circuitry configured to: set the dual-bandwidth threshold, store the dual-bandwidth threshold in the memory, determine a network bandwidth prediction value based on specified control information received from a video reception device, and determine whether to change the resolution or frame rate of the video signal based on the network bandwidth prediction value and the dual-bandwidth threshold;
   a video encoding unit comprising circuitry configured to: update frame sequence information based on the resolution or frame rate being changed, set an encoding parameter based on the changed resolution or frame rate, and encode the video signal based on the set encoding parameter; and
   a video output unit comprising circuitry configured to control the communication unit to transmit the encoded video signal to the video reception device,
   wherein the dual-bandwidth threshold includes a first upper bandwidth threshold, comprising a reference value for determining whether to increase the resolution or frame rate from a first resolution or first frame rate to a second resolution or second frame rate, and a first lower bandwidth threshold comprising a reference value for determining whether to decrease the resolution or frame rate from the second resolution or second frame rate to the first resolution or first frame rate.

2. The video transmission device of claim 1,
   wherein the video pre-processing unit is configured to set the first dual-bandwidth threshold based on an external input.

3. The video transmission device of claim 2, wherein based on the network bandwidth prediction value exceeding the first upper bandwidth threshold, the video pre-processing unit is configured to change the resolution or frame rate from the first resolution or first frame rate to the second resolution or second frame rate and, based on the network bandwidth prediction value being less than the first lower bandwidth threshold, the video pre-processing unit is configured to change the resolution or frame rate from the second resolution or second frame rate to the first resolution or first frame rate.

4. The video transmission device of claim 2, wherein the dual-bandwidth threshold further includes a second dual-bandwidth threshold,
   wherein the second dual-bandwidth threshold includes a second upper bandwidth threshold, comprising a reference value for determining whether to increase the resolution or frame rate from the first resolution or first frame rate to the second resolution or second frame rate and a second lower bandwidth threshold, comprising a reference value for determining whether to decrease the resolution or frame rate from the second resolution or second frame rate to the first resolution or first frame rate,
   wherein the second upper bandwidth threshold is a specified value larger than the first upper bandwidth threshold, and the second lower bandwidth threshold is a specified value smaller than the first lower bandwidth threshold, and
   wherein based on there being a resolution or frame rate change history within a specified time, the video pre-processing unit is configured to determine whether to change the resolution or frame rate based on the network bandwidth prediction value and the second dual-bandwidth threshold.

5. The video transmission device of claim 4, wherein the video pre-processing unit is configured to set the second dual-bandwidth threshold based on an external input or set the second dual-bandwidth threshold so that a difference between the second upper bandwidth threshold and the second lower bandwidth threshold has a specified value corresponding to a time difference between a video frame, where at least one of the resolution and frame rate has been changed most recently, and a current video frame.

6. The video transmission device of claim 1, wherein the video pre-processing unit is configured to determine not to change the resolution or frame rate based on there being a change in the frame rate or resolution within a specified time.

7. The video transmission device of claim 1, wherein the video pre-processing unit is configured to: set a multi-bandwidth threshold including at least one dual-bandwidth threshold respectively corresponding to at least one network bandwidth variation level, and determine whether to change the resolution or frame rate of the video based on a dual-bandwidth threshold corresponding to a variation level of the network bandwidth prediction value during a specified time, of the multi-bandwidth threshold.

8. A video transmission method, comprising:
   receiving a video signal;
   setting a dual-bandwidth threshold comprising a reference value for determining whether to change a resolution or a frame rate of the video signal;
   determining a network bandwidth prediction value based on specified control information received from a video reception device;
   determining whether to change the resolution or frame rate of the video based on the network bandwidth prediction value and the dual-bandwidth threshold;
   updating frame sequence information based on the resolution or frame rate being changed;
   setting an encoding parameter based on the changed resolution or frame rate;
   encoding the video signal based on the set encoding parameter; and
   transmitting the encoded video signal to the video reception device,
   wherein the dual-bandwidth threshold includes a first upper bandwidth threshold comprising a reference value for determining whether to increase the resolution or frame rate from a first resolution or first frame rate to a second resolution or second frame rate, and a first lower bandwidth threshold comprising a reference value for determining whether to decrease the resolution or frame rate from the second resolution or second frame rate to the first resolution or first frame rate.

9. The video transmission method of claim 8, wherein setting the dual-bandwidth threshold includes setting the first dual-bandwidth threshold based on an external input.

10. The video transmission method of claim 9, further comprising:
based on the network bandwidth prediction value exceeding the first upper bandwidth threshold, changing the resolution or frame rate from the first resolution or first frame rate to the second resolution or second frame rate; and
based on the network bandwidth prediction value being less than the first lower bandwidth threshold, changing the resolution or frame rate from the second resolution or second frame rate to the first resolution or first frame rate.

11. The video transmission method of claim 9, wherein the dual-bandwidth threshold further includes a second dual-bandwidth threshold,
wherein the second dual-bandwidth threshold includes a second upper bandwidth threshold, comprising a reference value for determining whether to increase the resolution or frame rate from the first resolution or first frame rate to the second resolution or second frame rate and a second lower bandwidth threshold, comprising a reference value for determining whether to decrease the resolution or frame rate from the second resolution or second frame rate to the first resolution or first frame rate,
wherein the second upper bandwidth threshold is a specified value larger than the first upper bandwidth threshold, and the second lower bandwidth threshold is a specified value smaller than the first lower bandwidth threshold, and
wherein determining whether to change the resolution or frame rate of the video includes, based on there being a resolution or frame rate change history within a specified time, determining whether to change the resolution or frame rate based on the network bandwidth prediction value and the second dual-bandwidth threshold.

12. The video transmission method of claim 11, wherein setting the dual-bandwidth threshold includes:
setting the second dual-bandwidth threshold based on an external input; or
setting the second dual-bandwidth threshold so that a difference between the second upper bandwidth threshold and the second lower bandwidth threshold has a specified value corresponding to a time difference between a video frame, where at least one of the resolution and frame rate has been changed most recently, and a current video frame.

13. The video transmission method of claim 8, wherein determining whether to change the resolution or frame rate of the video includes determining not to change the resolution or frame rate based on there being a change in the frame rate or resolution within a specified time.

14. The video transmission method of claim 8, further comprising:
setting a multi-bandwidth threshold including at least one dual-bandwidth threshold respectively corresponding to at least one network bandwidth variation level; and
determining whether to change the resolution or frame rate of the video based on the network bandwidth prediction value and a dual-bandwidth threshold corresponding to a variation level of the network bandwidth prediction value during a specified time, of the multi-bandwidth threshold.

* * * * *